April 19, 1932.    R. E. LASLEY    1,854,615
POWER PLANT
Filed May 9, 1930    4 Sheets-Sheet 2
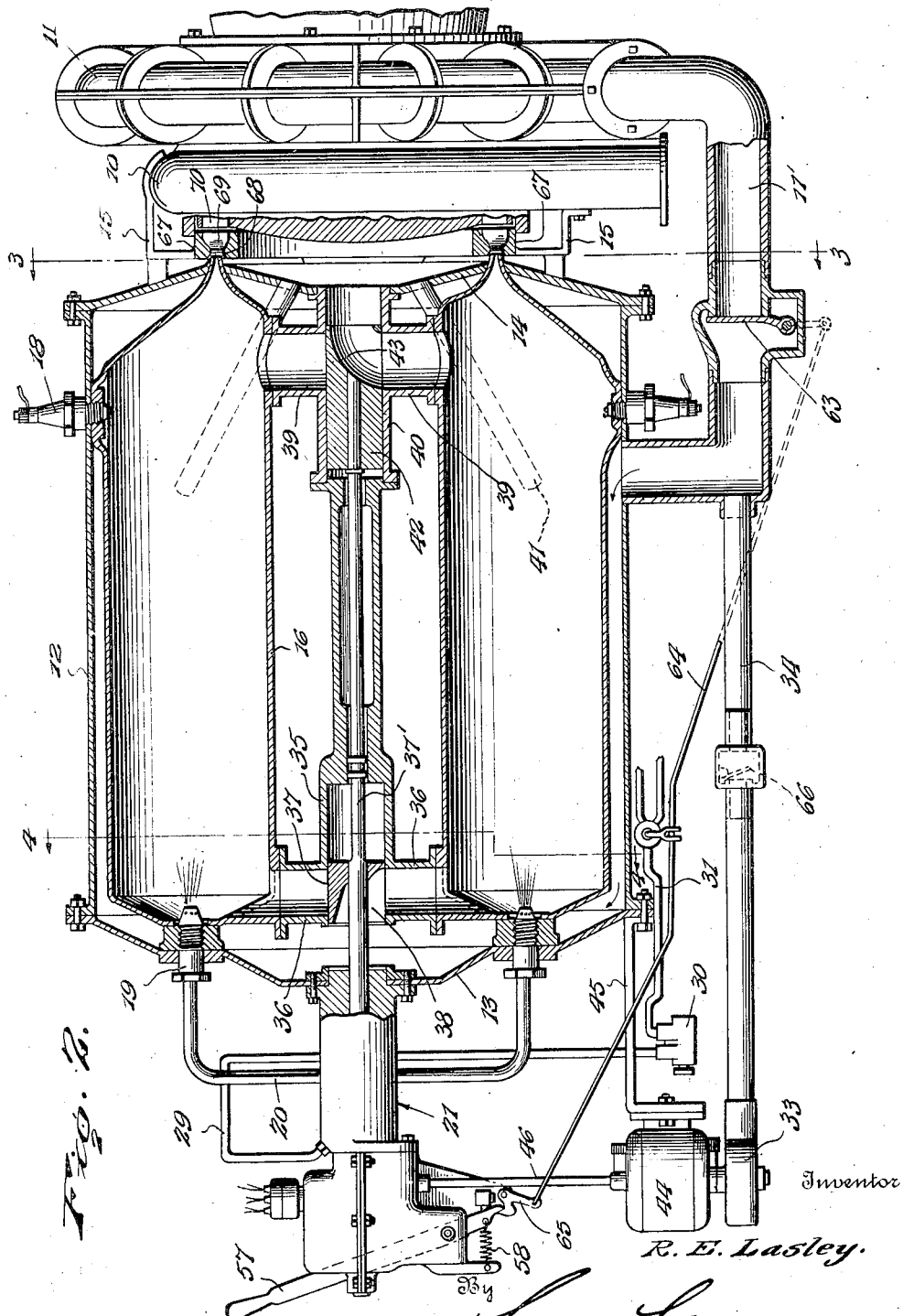

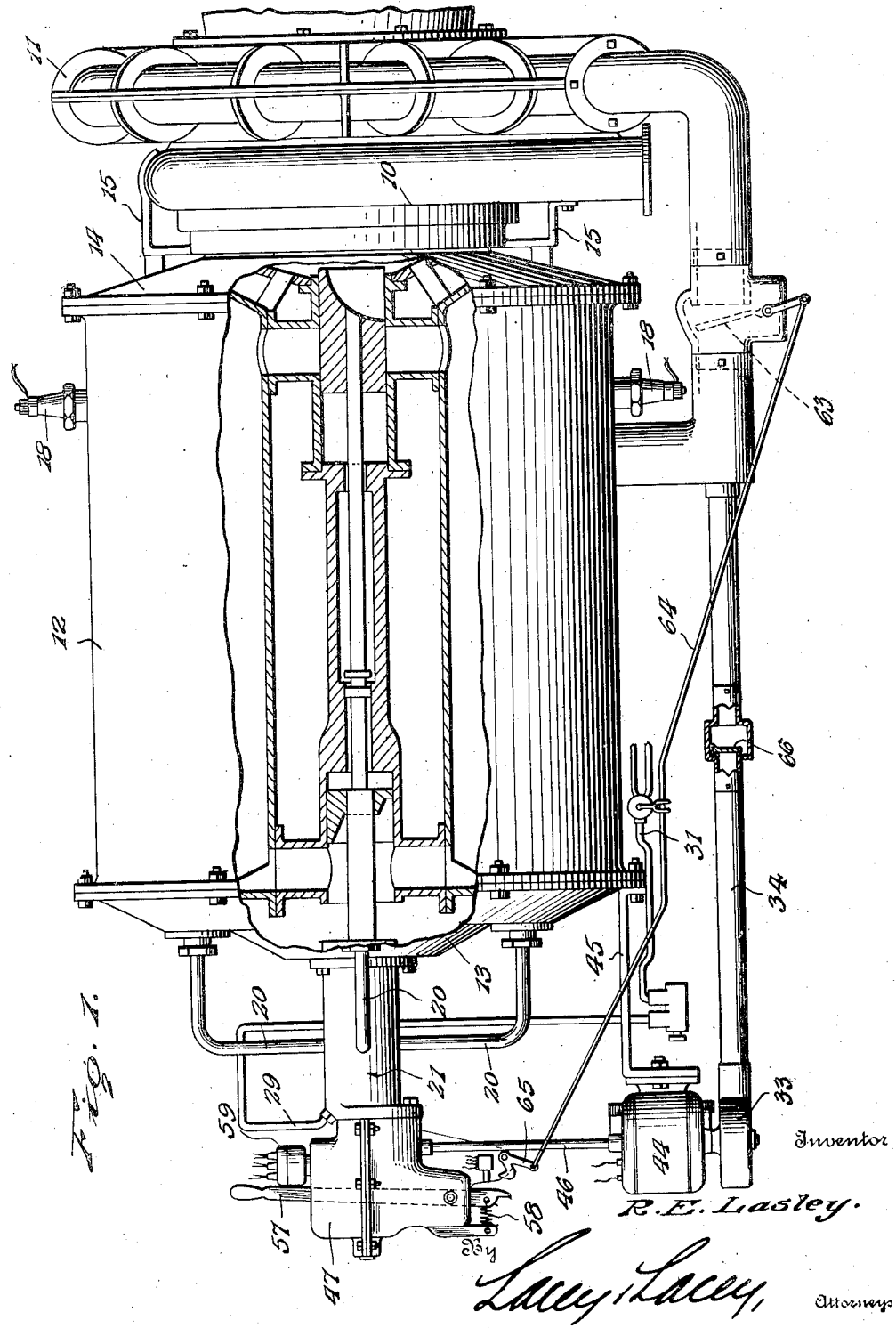

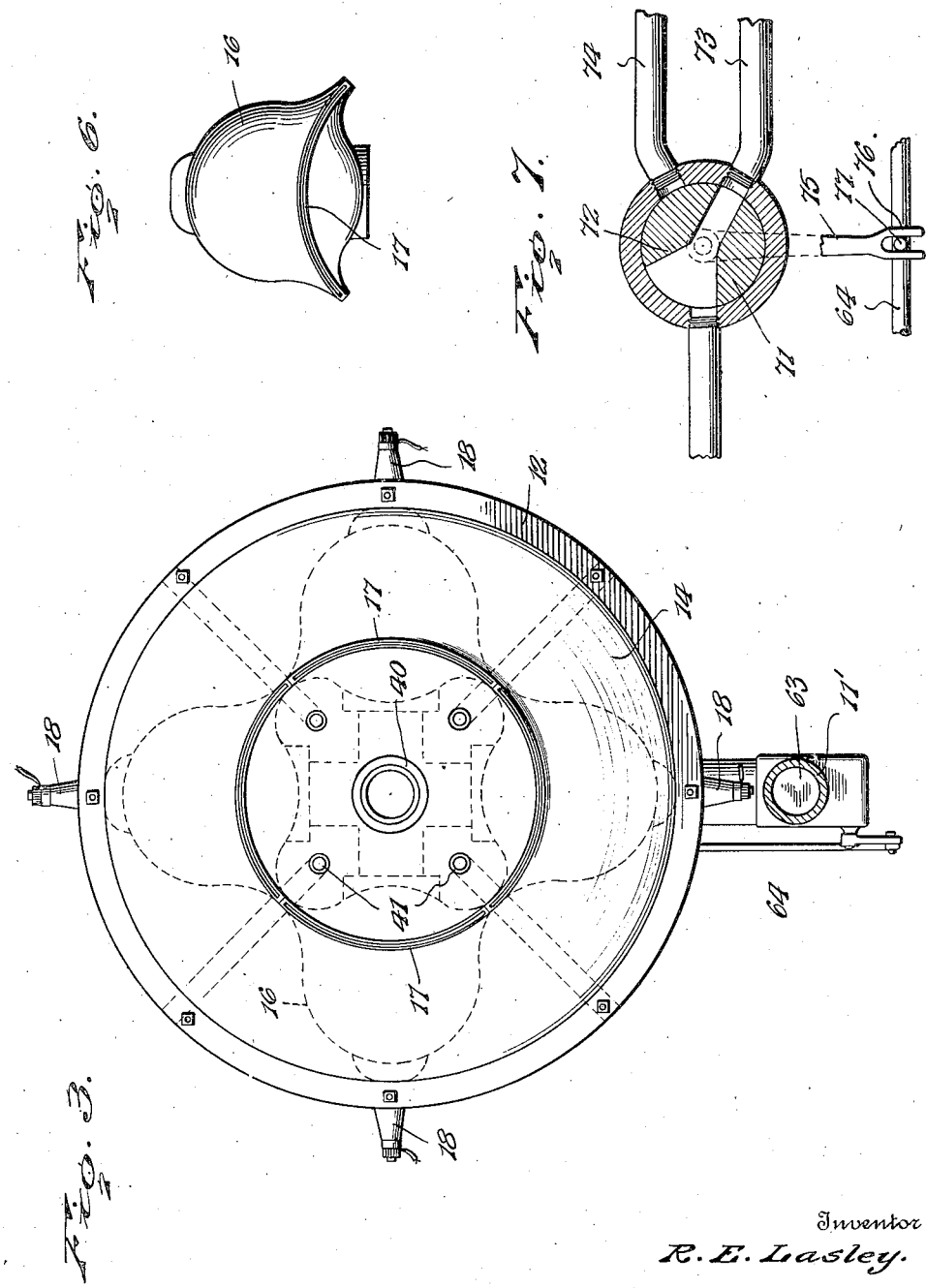

April 19, 1932. R. E. LASLEY 1,854,615
POWER PLANT
Filed May 9, 1930  4 Sheets-Sheet 4
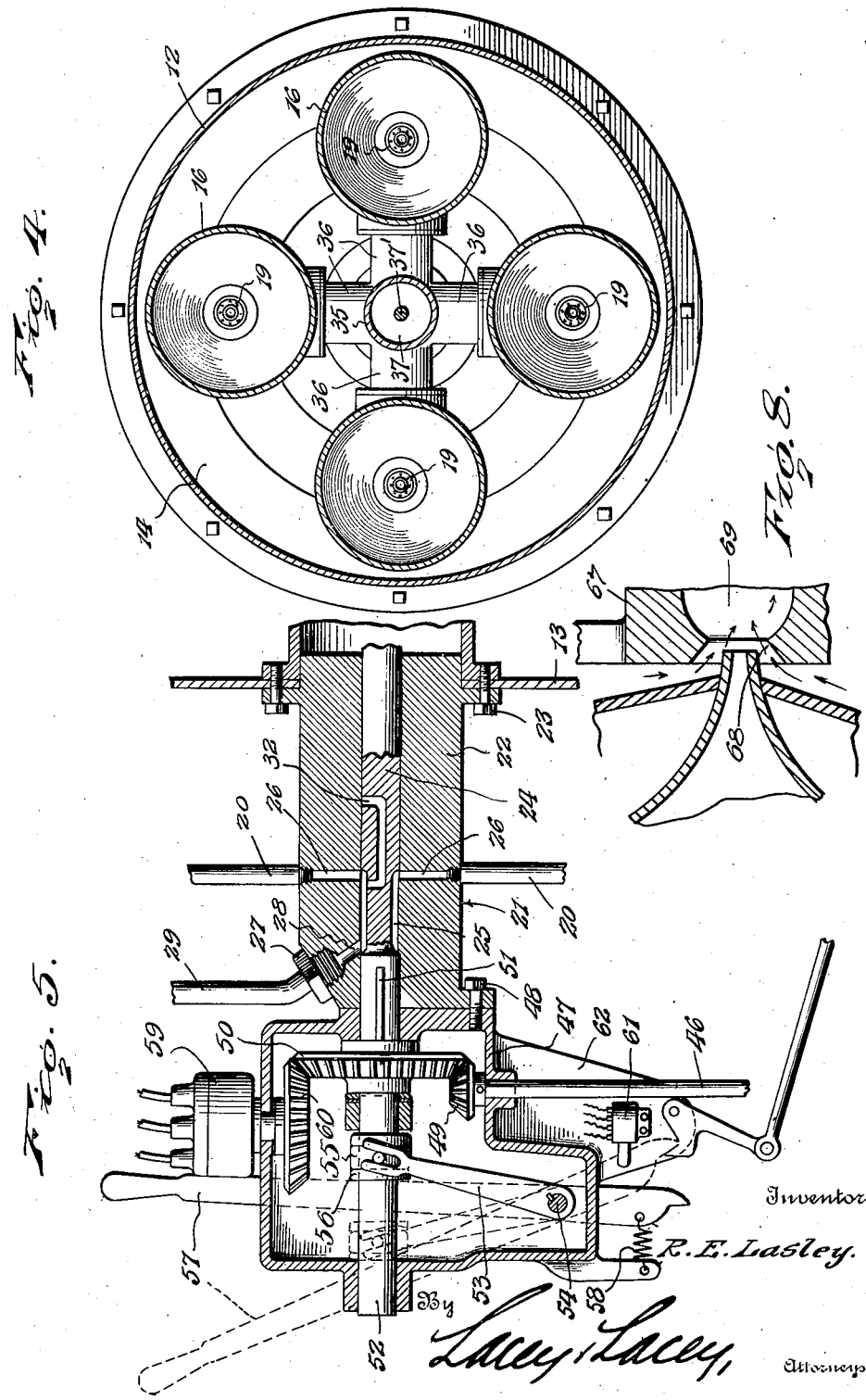

Patented Apr. 19, 1932

1,854,615

UNITED STATES PATENT OFFICE

ROBERT E. LASLEY, OF WAUKEGAN, ILLINOIS

POWER PLANT

Application filed May 9, 1930. Serial No. 451,104.

This invention relates to power plants of that general type described in my co-pending application Serial No. 281,902, filed May 31, 1928.

An object of the present invention is to provide improved means to permit easy starting of the power plant and for this purpose the invention embodies a plurality of combustion chambers for delivering the products of combustion at high velocity and high temperature to the turbine, the chambers being adapted to be fired in sequence in much the same manner as the cylinders of a gas engine.

A further object of the invention is to provide novel controlling valves for the combustion chambers which permit of quick scavenging of the chambers during the starting operation.

A further object of the invention is to provide means for automatically cutting out the auxiliary blower and ignition mechanism and setting the valves to continuously admit fuel mixture to the combustion chambers when the turbine has attained sufficient speed to cause the compressor operated thereby to deliver air under sufficient pressure and volume to the combustion chambers to effect continuous operation thereof.

A still further object is to provide novel slit-like arcuate nozzles for the combustion chambers which enter similar shaped injector throats of the turbine and permit of the entraining of atmospheric air along with the products of combustion whereby to reduce the temperature and speed of the same to the proper degree required for the operation of the turbine.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

The invention is illustrated in the accompanying drawings wherein,

Figure 1 is a side elevation of a power plant embodying my improvements, and showing the positions occupied by the valves when the power plant is running with continuous combustion in the combustion chambers, Figure 2 is a longitudinal sectional view through the power plant with parts in elevation, Figure 3 is a cross-sectional view on the line 3—3 of Figure 2, Figure 4 is a cross-sectional view on the line 4—4 of Figure 2, Figure 5 is an enlarged detail sectional view showing the controlling lever and fuel mixture valves, Figure 6 is an end elevation of one of the combustion chambers showing the nozzle, Figure 7 is a detail perspective view showing the valve in the fuel lines, Figure 8 is an enlarged detail sectional view showing the construction for entraining atmospheric air at each nozzle.

Referring now to the drawings in which like characters of reference designate similar parts, 10 designates a turbine and 11 an air compressor operated by the turbine and since these parts are fully described in my above mentioned co-pending application a detailed description thereof will not here be entered into in so much as the present invention resides more specifically in the combustion chambers for supplying the products of combustion to the turbine.

The preferred embodiment of my present invention comprises a casing 12 which is substantially cylindrical in contour and both ends of the casing are closed by heads 13 and 14. The head 14 is dished at the center portion thereof for a purpose which will presently be explained. Brackets 15 preferably are secured to the head 14 and to the turbine to rigidly secure the casing and the turbine together as a unit.

Disposed longitudinally within the casing 12 as best shown in Figures 2 and 4 is a plurality of combustion chambers 16, preferably four in number. It is not intended to limit the number of combustion chambers to four as but a single chamber or any multiple thereof may be used in practice, according to the size and power of the power plant. The combustion chambers are spaced from each other and from the wall of the casing and each combustion chamber is provided at the delivery end with an arcuate slitlike nozzle 17 as best shown in Figure 6. The nozzles 17 project through the head 14 of the casing and as best shown in Figure 3 the nozzles are sufficient in length to each form a quadrant of a circle which is concentric with the longitudinal axis of the casing 12.

Each combustion chamber is equipped with a spark plug 18 near the nozzle thereof whereby the combustible mixture may be ignited near the delivery end of the combustion chamber when the power plant is being started by means of the auxiliary starting mechanism hereinafter described.

Each combustion chamber is equipped with a spray nozzle 19, which enters the combustion chamber through the head 13 of the casing 12. These spray nozzles are connected by pipes 20 to a fuel mixture controlling valve indicated by the numeral 21 and best shown in Figure 5. Said valve controls the admission of fuel mixture to the chambers and will now be described in detail.

The valve 21 comprises a housing 22 which is bolted as shown at 23 to the head 13 of the casing. A cylindrical rotary valve 24 is mounted in the housing and is reduced near one end thereof to provide an annular space 25. The annular space at one end thereof communicates with the pipes 20 through radially disposed passages 26. The annular space near the opposite end thereof communicates with a spray jet nozzle 27 through the instrumentality of a passage 28. The spray jet nozzle is connected by a pipe 29 to a pump 30 as shown in Figure 2, the pump being in turn connected by a pipe 31 to a source of fuel supply as will hereinafter be more fully described.

A by-pass 32 extends longitudinally of the valve, one end of the by-pass connecting with the annular space 25 and the opposite end opening through the valve and being adapted to register with the pipes 20 in sequence when the valve is shifted outwardly. It is now clear that when the valve is in the position shown in Figure 5, all the pipes 26 will be continuously supplied by fuel from the pump lines. This condition exists when the power plant is operating continuously. However, when it is desired to start the power plant, the valve 24 is shifted outwardly to bring the by-pass 32 into position to connect the pipes 20 with the spray jet whereby the combustion chambers are supplied in succession with fuel through the respective spray nozzles 19 thereof.

Compressed air is supplied to the combustion chambers in the proper proportion relatively to the fuel to produce a highly combustible mixture and for this purpose the above mentioned compressor 11 operated by the turbine is used when the power plant is operating continuously. However, an auxiliary air supply is used to start the power plant and for this purpose a blower 33 is used, the same being connected by a pipe 34 to the pipe 11' which enters the casing 12 from the air compressor 11.

The compressed air in the casing 12 as designated by the arrow heads enters the combustion chambers 16 near the spray nozzles 19 thereof. For controlling the supply of air to the chambers a tubular housing 35 is mounted axially in the casing 12 and is connected by pipes 36 to the intake ends of the respective combustion chambers.

The housing is open at the end and rotatably mounted in said open end is a valve 37. The valve 37 rotates as a unit with the above described fuel controlling valve 24 and for this purpose the latter is extended longitudinally therethrough and forms a stem 37' for the valve 37.

The port 38 in the valve 37 is so disposed that it will establish communication between the interior of the casing 12 and one of the combustion chambers 16 when the fuel control valve 24 is in corresponding position to permit the fuel from the pump line being supplied through the pipe 20 to the spray nozzle of said combustion chamber.

Thus, it will be seen that during rotation of the valve 37 each of the combustion chambers will be supplied in sequence with compressed air as well as with fuel. It will be pointed out that said compressed air is heated by the combustion chambers so as not to lower the temperature of the combustible mixture and furthermore such compressed air performs the additional function of a cooling agent for cooling the combustion chambers so that a refractory lining therefor is unnecessary.

To facilitate quick scavenging of each combustion chamber each chamber is provided near the nozzle thereof with a pipe 39 which opens into a valve housing 40, the same being disposed axially in the casing 12. The valve housing opens at one end through the above mentioned head 14 of the casing, said head confronting the turbine 10 and defining a space between the dished portion of the head and the turbine. Said space is in communication with the atmosphere by means of pipes 41 which open through the head 14 and through the longitudinal wall of the casing 12.

The valve stem 37' extends into the housing 40 and is equipped with an integral valve 42, the same having a port 43 which is so disposed as to establish communication between the vented space outside of the casing head 14 and one of the combustion chambers when the air inlet valve 37 of that same chamber is disposed to establish communication between the compressed air supply within the casing and the interior of the combustion chamber.

Thus, the incoming charge of compressed air mixed with fuel forces ahead of it the burnt charge and quickly scavenges the combustion chamber.

For rotating the fuel controlling valve as well as the compressed air intake valve and the scavenging valve, a motor 44 is preferably secured to the casing 12 by means of a bracket 45. The driven shaft 46 of the motor projects below the motor and drives the above mentioned auxiliary blower 33 and also projects upwardly and enters a housing 47 which is bolted as shown at 48 to the valve housing 22. The shaft is equipped with a pinion 49 which meshes with a gear 50 that is keyed as shown at 51 to a shaft 52 which forms a continuation of the valve 24, whereby the shaft may be slid longitudinally through the gear but the gear will be held against independent rotation on the shaft.

For shifting the fuel controlling valve 24 outwardly to starting position a shipper 53 is disposed on a shaft 54 carried by the housing 47. The free end of the shipper is connected in the usual manner to an idling collar 55 which is disposed between fixed collars 56 on the shaft 52.

A handle lever 57 is secured to the shaft 54 and projects below the housing 47 and is normally held by a spring 58 in vertical position. When the handle lever is grasped and rocked to the position shown in dotted lines in Figure 5 the shipper 53 will move the shaft 52 through the gear 51 thereby disposing the bypass 32 in position to supply the combustion chambers with fuel in succession while the valve is being rotated through the instrumentality of the gear 50, pinion 49, shaft 46 and motor 44.

It will here be pointed out that the combustion chambers are fired in succession after receiving sufficient charge of combustible mixture and for this purpose a distributer 59 of the usual and well known type is mounted on the housing 47 and is driven by a pinion 60 which meshes with the gear 50. A switch 61 is disposed on a bracket 62 carried by the housing and is closed by the projecting lower end of the lever 57 when the lever is rocked to the position shown in dotted lines. This switch is connected in the primary ignition circuit and when closed operates in the usual manner to energize the distributer for supplying current to the spark plugs 18 in sequence.

Obviously, when the compressor 11 has attained such speed as to supply air under sufficient pressure and volume to the combustion chambers to effect continuous operation thereof, the auxiliary starting mechanism is no longer needed and to provide for the automatic cutting out of this mechanism there is a hinged valve 63 disposed in the outlet pipe 11' of the compressor. This valve is connected by a rod 64 to a pivoted catch 65 carried by the bracket 62 of the housing 47. The pivoted catch engages the lower end of the lever 57 when the latter is rocked to the position shown in Figure 2 and holds the lever in this position against the tension of its controlling spring 58. When the pressure and volume have been built up sufficiently in the pipe 11' to rock the valve 63 open, the rod 64 trips the catch 65 thereby permitting the lever 57 to be returned by its spring to vertical position and dispose the fuel supply valve in the position shown in Figure 5 for continuously supplying fuel to the combustion chambers. Simultaneously with the tripping of the catch 65 the switch 61 is opened by release of the lever 57 therefrom so that the circuit to the motor 44 is opened, it being understood that the motor is energized from the same source of electrical current that the spark plugs are energized from. The blower is consequently cut off as well as the ignition.

The built up pressure in the pipe 11' closes a valve 66 in the pipe 33 from the auxiliary blower to prevent compressed air backing up in this pipe to the blower.

By now again referring to Figure 1 it will be seen that the turbine 10 is equipped with a ring 67 which is provided with an annular series of injector throats 68 corresponding in arcuate shape with the nozzles 17. The latter enter the injector throats 68. As described in my co-pending application above mentioned the injector throats are open to the atmosphere, the purpose of this being to permit atmospheric air being entrained along with the products of combustion from the combustion chambers whereby to reduce the temperature and speed of the same to the proper degree required for operation of the turbine. As illustrated the ring 67 is equipped with blades 69 which deliver the products of combustion together with the entrained air against the vanes 70 of the turbine wheel.

It is preferable to start the power plant with gasoline and for this purpose as shown in Figure 7 there is disposed in the pump line 31 a valve 71 which is equipped with a passage 72 therethrough adapted to be selectively brought into register with a pipe 73 leading to a suitable source of gasoline supply or a pipe 74 leading to a suitable source of fuel oil supply. The valve is provided with a lever 75 having a terminal fork 76 receiving a pin 77 on the trip rod 64. When the valve 63 in the compressed air pipe 11' opens the trip rod will shift the valve 71 to disconnect the gasoline supply from the pump line and connect the fuel oil supply thereto.

The operation of the device is as follows:

To start the power plant the lever 57 is pulled back thereby closing the electrical switch 61 and sliding the rotating valve 22, intake valve 37 and scavenging valve 42 to position for admitting fuel mixture through the intake valve and allowing the ignited mixture to exhaust or scavenge through the exhaust valve as most clearly shown in Figure 2. The electrical switch being on starts the electric motor 44 which operates the valve shaft 52 carrying the valves 24, 37 and 42 and at the same time drives the blower 33 which supplies the compressed air through the pipe 34. The compressed air passes through the casing 12 and around the combustion chambers 16 and enters the combustion chambers through the intake valves 37 in sequence while at the same time the fuel enters the chambers in sequence through the spray nozzles 19 and is mixed with the compressed air.

When sufficient time has elapsed to allow any particular combustion chamber to fill with fuel mixture the valves all have arrived at closed position and the distributer 59 makes electric contact to the corresponding spark plug 18 thereby igniting the charge which discharges through the nozzle 17 of the combustion chamber into the injector throat 68 where it enters between the guide blades and is directed against the vanes of the turbine wheel.

The combustion chambers are thus supplied with fuel and fired consecutively until the turbine has reached sufficient speed to cause the compressor 11 operated by the turbine to build up a sufficient pressure to open the valve 63. When the valve 63 opens it shifts the rod 64 and disconnects the catch 65 whereby the lever is moved to forward position by the spring 58 thereby shifting the valves 24, 37 and 42 into forward position. The valve 42 is so arranged on the valve stem 37' that when in forward position it maintains the pipes 39 of all four combustion chambers closed while the valve 37 when in forward position maintains the air intake pipes 36 of all four combustion chambers open and thus air and fuel are admitted continually and burned continually in all four chambers.

The product of combustion passes through the nozzles 17 and entrains sufficient atmospheric air to lower the temperature of the product of combustion to a point that is safe to discharge into the turbine without causing damage.

Having thus described the invention, I claim:

1. In a power plant, an air compressor, a compressed air casing, a combustion chamber in said casing, ignition means for the combustion chamber, means for admitting vaporized fuel to said chamber, means for admitting compressed air from said casing to said chamber, a blower, electrical means for operating said ignition means and said blower, a pipe connecting said blower and said compressor to said casing, a valve in said pipe, and means operatively connected to said electrical means and to said valve for cutting out said electrical means whereby to de-energize said blower and said ignition means when said valve is opened by predetermined pressure built up in said pipe by said compressor.

2. In a power plant, a turbine, an air compressor operated thereby, a compressed air casing, a plurality of combustion chambers in said casing adapted to deliver the products of combustion thereof to said turbine, means for entraining atmospheric air along with the products of combustion entering said turbine from said chamber, ignition means for the chambers adapted to be energized in succession, means for admitting vaporized fuel to said chambers, means for admitting compressed air from said casing to said chambers, a blower, electrical means for operating said ignition means and said blower, a pipe connecting said blower and said compressor to said casing, a valve in said pipe, and means operatively connected to said electrical means and to said valve for cutting out said electrical means whereby to de-energize said blower and said ignition means when said valve is opened by predetermined pressure built up in said pipe by said compressor.

3. In a power plant, a turbine having an annular series of injector throats open to the atmosphere, a compressor operated by the turbine, a compressed air casing, a plurality of combustion chambers in said casing spaced from the casing and from each other, an annular series of arcuate slit like discharge nozzles for the combustion chambers entering said injected throats for entraining atmospheric air along with the products of combustion from said chambers to said turbine, ignition means for the chambers, means for admitting vaporized fuel to said chambers, means for admitting compressed air from said casing to said chambers, a blower, electrical means for operating said ignition means and said blower, a pipe connecting said blower and said compressor to said casing, a valve in said pipe, and means operatively connected to said electrical means and to said valve for cutting out said electrical means whereby to deenergize said blower and said ignition means when said valve is opened by predetermined pressure built up in said pipe by said compressor.

4. In a power plant, an air compressor, a compressed air casing, a combustion chamber in said casing, a spark plug for the combustion chamber, a pipe for conducting vaporized fuel to said chamber, a pipe for conducting air from said casing to said chamber, rotary valves in said pipes shiftable longitudinally as a unit to supply fuel and air intermittently or continuously to said chamber, a spring pressed lever for shifting said valves, a blower, electrical devices for operating said blower for rotating said valves and for firing said spark plug, a switch adapted to be closed by said lever for energizing said electrical devices, a pipe for conducting air from said blower and said compressor to said casing, a valve in said pipe, and a trip rod operatively connected to said lever and to said valve, said valve opening when a predetermined pressure is built up in said pipe by said compressor and operating said trip rod to release said lever whereby to open said switch and render said electrical devices inoperative, said lever being moved by its spring after release to set said valves to deliver fuel and air continuously to said chamber.

5. In a power plant, an air compressor, a compressed air casing, a combustion chamber in said casing, a spark plug for the combustion chamber, a pipe for conducting vaporized fuel to said chamber, a pipe for conducting air from said casing to said chamber, rotary valves in said pipes shiftable longitudinally as a unit to supply fuel and air intermittently or continuously to said chamber, a spring pressed lever for shifting said valves, a pivoted catch for holding said lever at one limit of its movement against the tension of its spring, a blower, a motor for driving said blower and rotating said valves, a switch for controlling said motor and said spark plug and disposed in the path of movement of said lever whereby the switch is closed when said lever is held by said catch, a pipe for conducting air from said blower and said compressor to said casing, a valve in said pipe, and a trip rod connected to said valve and to said catch adapted to be moved by opening of said valve upon a predetermined pressure being built up in said pipe by said compressor to release said catch and permit said lever to open said switch and shift said valves whereby to continuously supply a combustible mixture to said chamber and to de-energize the motor, the blower and the spark plug.

6. In a power plant, an air compressor, a compressed air casing, a combustion chamber in said casing, a spark plug for the combustion chamber, a pipe for conducting vaporized fuel to the chamber, a pipe for conducting air from said casing to said chamber, a pipe for scavenging said chamber, rotary valves in said pipes, the scavenging valve being timed to open and close prior to opening and closing of the air and fuel valves, said valves being shiftable longitudinally as a unit in one direction to intermittently supply a combustible mixture of fuel and air to the chamber, shifting of the valves in the oposite direction suplying a combustible mixture of air and fuel continuously to the chamber, a spring pressed lever for shifting said valves, a blower, electrical devices for operating said blower for rotating said valves and for firing said spark plug, a switch adapted to be closed by said lever for energizing said electrical devices, a pipe for conducting air from said blower and said compressor to said casing, a valve in said pipe, and a trip rod operatively connected to said lever and to said valve, said valve opening when a predetermined pressure is built up in said pipe by said compressor and operating said trip rod to release said lever whereby to open said switch and render said electrical devices inoperative, said lever being moved by its spring after release to set said valves to deliver fuel and air continuously to said chamber and close said scavenging valve.

7. In a power plant, an air compressor, a compressed air casing, a combustion chamber in said casing, a spark plug for the combustion chamber, a pipe for conducting vaporized fuel to the chamber, a pipe for conducting air from said casing to said chamber, a pipe for scavenging said chamber, rotary valves in said pipes, the scavenging valve being timed to open and close prior to opening and closing of the air and fuel valves, said valves being shiftable longitudinally as a unit in one direction to intermittently supply a combustible mixture of fuel and air to said chamber, shifting of the valves in the opposite direction supplying a combustible mixture of air and fuel continuously to said chamber, a spring pressed lever for shifting said valves, a pivoted catch for holding said lever at one limit of its movement against the tension of its spring, a blower, a motor for driving said blower and rotating said valves, a switch for controlling said motor and said spark plug and disposed in the path of movement of said lever whereby the switch is closed when said lever is held by said catch, a pipe for conducting air from said blower and said compressor to said casing, a valve in said pipe, and a trip rod connected to said valve and to said catch adapted to be moved by opening of said valve upon a predetermined pressure being built up in said pipe by said compressor to release said catch and permit said lever to open said switch to de-energize the motor, the blower and the spark plug and to shift said valves whereby to continuously supply a combustible mixture to said chamber.

8. In a combustion apparatus for power plants, a compressed air casing, a plurality of combustion chambers therein, discharge nozzles for the chambers projecting exteriorly of the casing, valve controlled air inlet pipes establishing communication between the casing and the chambers remote from said nozzles, valve controlled fuel pipes for supplying vaporized fuel to the chambers adjacent to said air inlet pipes, the fuel and air valves being rotatable and shiftable as a unit, means for rotating said valves to supply air and fuel simultaneously to the chambers in sequence, means for shifting said valves to supply air and fuel simultaneously to said chambers continuously, and electrical means for firing the combustible mixture of air and fuel in said chambers in sequence.

9. In a combustion apparatus for power plants, a compressed air casing, a plurality of combustion chambers therein, nozzles for the combustion chambers projecting exteriorly of the casing, valve controlled air inlet pipes establishing communication between the casing and the chambers remote from said nozzles, valve controlled scavenging pipes establishing communication between the exterior of the casing and the chambers and disposed adjacent to said nozzles, valve controlled pipes for supplying vaporized fuel to the chambers adjacent to said air inlet pipes, the fuel the scavenging and the air inlet valves being rotatable and shiftable as a unit, means for rotating said valves, means for shifting said valves, shifting of said valves in one direction positioning the valves to intermittently supply a combustible mixture of fuel and air to said chamber and scavenge the chamber, shifting of the valves in the opposite direction positioning the valves to continuously supply said mixture to said chamber and closing the scavenging valve, and means for firing the combustible mixture of air and fuel in said chambers in sequence.

In testimony whereof I affix my signature.

ROBERT E. LASLEY.